United States Patent [19]
Hoffman

[11] Patent Number: 5,297,766
[45] Date of Patent: Mar. 29, 1994

[54] POT LID HOLDER

[76] Inventor: Frederick A. Hoffman, 602 Apollo Pkwy., Westfield, Ind. 46074

[21] Appl. No.: 966,293

[22] Filed: Oct. 26, 1992

Related U.S. Application Data

[63] Continuation-in-part of Ser. No. 818,335, Jan. 9, 1992, Pat. No. 5,170,978.

[51] Int. Cl.⁵ .................................. A47F 5/00
[52] U.S. Cl. ........................ 248/309.1; 248/205.3
[58] Field of Search ............. 248/309.1, 310, 314, 248/339, 301, 303, 304, 305, 322, 311.2, 205.3, 683, 110, 113, 317; 211/88

[56] References Cited

U.S. PATENT DOCUMENTS

| | | | |
|---|---|---|---|
| 3,192,894 | 8/1963 | Staver | 248/314 |
| 4,136,848 | 1/1979 | McCollum. | |
| 4,312,455 | 1/1982 | Weber | 248/314 X |
| 4,850,556 | 7/1989 | Otani et al. | 248/309.1 X |
| 4,936,536 | 6/1990 | Meneghello | 148/909 X |
| 5,038,945 | 8/1991 | Melkonian | 211/96 |
| 5,048,677 | 9/1991 | Pedracine | 248/309.1 |
| 5,170,978 | 12/1992 | Hoffman | 248/309.1 |
| 5,183,231 | 2/1993 | Pellerin | 248/309.1 X |

Primary Examiner—Ramon O. Ramirez
Attorney, Agent, or Firm—Woodard, Emhardt, Naughton, Moriarty & McNett

[57] ABSTRACT

A pot lid holder. The holder includes a main body with an outwardly opening slot located at one end of the main body through which the vertically extending handle of a lid may be extended and held. One version has a pair of walls extending upwardly from a bottom wall with the pair of walls attached to a top wall securable to a shelf. A second version has an arm extending upwardly from the bottom wall with the arm attachable to the shelf.

11 Claims, 7 Drawing Sheets

POT LID HOLDER

CROSS-REFERENCE TO RELATED APPLICATION

This application is a continuation-in-part of my co-pending allowed U.S. patent application Ser. No. 07/818,335, filed Jan. 9, 1992 and entitled POT LID HOLDER, now U.S. Pat. No. 5,170,978.

BACKGROUND OF THE INVENTION

1. Field of the Invention

This invention is in the field of brackets for holding various items.

2. Description of the Prior Art

A variety of brackets have been designed to removably hold different types of tools, utensils and miscellaneous items. For example, U.S. Pat. No. 4,136,848 discloses a bracket mountable to a wall for holding a fishing pole. Such brackets generally are not readily available for use in holding and sorting lids for kitchen pots. Instead, kitchen pots and lids are stored in cabinets or drawers in a random manner providing a messy and cluttered appearance. I have therefore designed a bracket which may be used to removably hold a pot lid or utensil in an optimum manner. The bracket is designed to be mounted beneath a shelf or on a wall thereby allowing for storage of the lids in an area that is normally not utilized. Some of the brackets disclosed herein include a dual mounting capability for storing lids with different shaped handles.

I am aware of several U.S. patents which disclose a variety of brackets for mounting various items. For example, U.S. Pat. No. 4,936,536 issued to Meneghello and U.S. Pat. No. 5,038,945 issued to Melkonian disclose pot lid holders for holding the lid so that the longitudinal axis extending centrally through the handle extends respectively horizontally and vertically. U.S. Pat. No. 3,192,894 issued to Staver discloses a right angle bracket having a slotted concave surface, in turn, holding the vertically extending handle of a soap dispenser. The U.S. Pat. No. 5,048,677 issued to Pedracine discloses a holder device to both vertically and horizontally secure an object. Last, the U.S. Pat. No. 4,312,455 issued to Weber discloses a holding device securable by adhesive means beneath a counter with the holder having hooks for hanging hand bags and similar objects.

Despite the many prior brackets, there is still a need for providing a easy to use and inexpensive bracket for storing pot lids or utensils. Several embodiments of my bracket are disclosed herein. The mounting brackets disclosed herein provide versatility in that the bracket or pot lid holder may be mounted in any plane including the vertical or horizontal plane and can be mounted at any angle relative to these planes. That is, the pot lid holder may be mounted not only beneath a horizontal shelf but on a vertical wall, and inclined wall or any wall or mounting surface at any angle. The user may therefore determine how the pot lid holder is to be oriented or mounted to achieve its maximum effectiveness.

SUMMARY OF THE INVENTION

A bracket for hanging to a wall a lid with a handle including a main body mountable to the wall and including an upper portion. The main body further including a lower portion spaced apart by a gap from the upper portion with the lower portion including a first end portion and a second end portion. The lower portion including at one end thereof an upwardly facing stop surface operable by gravity to removably hold and retain the handle in the gap.

It is an object of the present invention to provide a new and improved bracket for holding a pot lid or other such device.

A further object of the present invention is to provide a bracket for holding a pot lid or utensil having either a vertically extending knob or a horizontally extending handle.

In addition, it is an object of the present invention to provide a pot lid holder allowing for the organization and storing of pot lids while maximizing the use of air space within a cabinet or on any wall or mounting surface.

A further object of the present invention is to provide a pot lid holder for storing lids allowing for quick selection.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
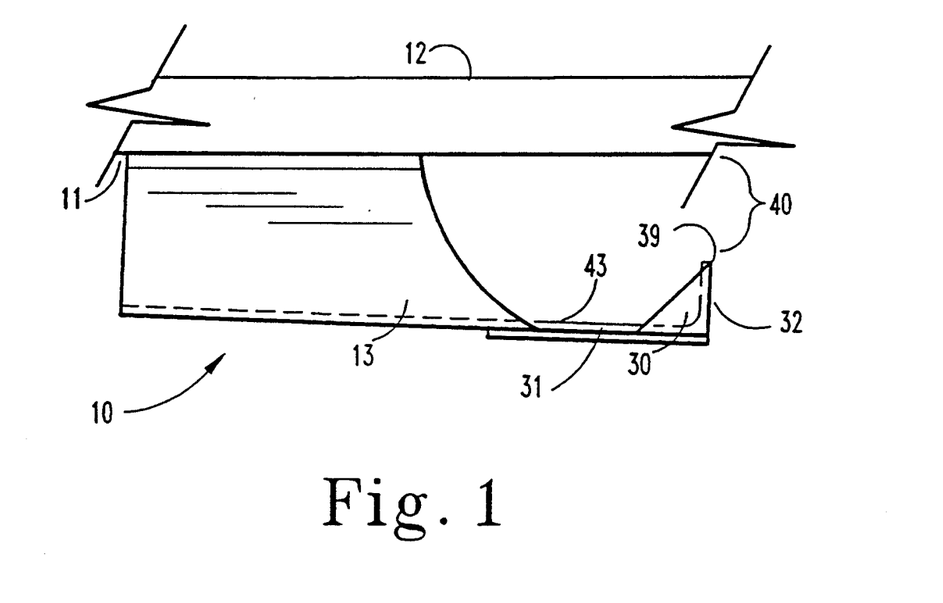
FIG. 1 is a side view of a third alternate embodiment of the POT LID HOLDER incorporating the present invention.
Figure 2:
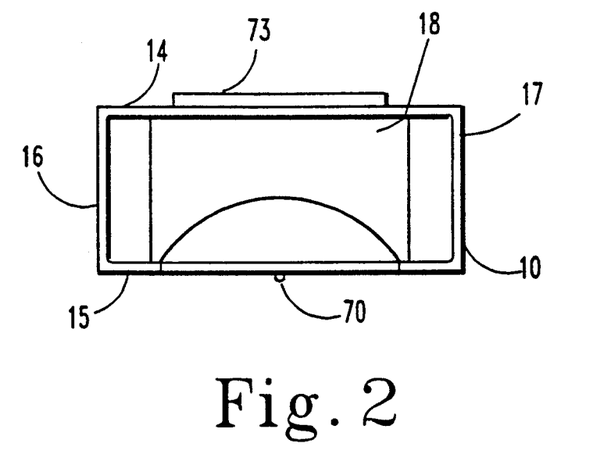
FIG. 2 is a front side view of the POT LID HOLDER of FIG. 1.
Figure 3:
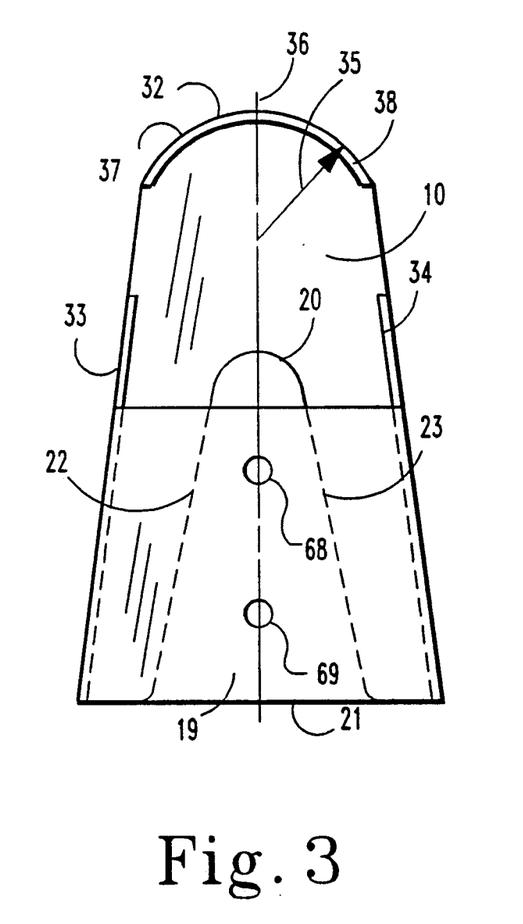
FIG. 3 is a top view of the POT LID HOLDER of FIG. 2.

Referring now more particularly to FIGS. 1-3, there is shown the third alternate embodiment of the POT LID HOLDER incorporating the present invention. Pot lid holder 10 is shown fixedly mounted to a surface 11 of shelf 12 typically located within a kitchen cabinet. The pot lid holder 10 is a bracket for holding a utensil with a handle and includes a main body 13 configured as a four-sided channel and including an upper wall 14, lower wall 15, and a pair of side walls 16 and 17 integrally joined together and defining a hollow interior 18. The main body may be formed from plastic thereby providing an integral one-piece construction.

Bottom wall 15 has an outwardly opening slot 19 to receive and hold a vertically extending handle of a utensil such as a pot lid while positioning the handle within the hollow interior 18 formed between the bottom and top walls of the bracket. Slot 19 includes a closed end 20 and an open end 21 with the slot edges 22 and 23 of bottom wall 15 converging in a direction from open end 21 to closed end 20. Thus, the vertically extending handle 24 of lid 25 (FIG. 6) may be extended into slot 19 thereby positioning the headed top end 26 of the handle within interior 18 with the vertically extending portion 24 of the handle engaging the mutually facing and vertically extending stop surfaces of edges 22 and 23 with the bottom surface of the enlarged handled head 26 resting atop the interior surface of bottom wall 15 immediately adjacent edges 22 and 23.

Side walls 16 and 17 have a height extending from bottom wall 15 to top wall 14 greater at the location adjacent slot open end 21 as compared to the height of the side walls at the location near the closed end 20 of the slot. As a result, bottom wall 15 is not parallel to top wall 14 but instead diverges therefrom in a direction from the open end 21 of the slot to the closed end 20. Thus, when the top wall 14 is mounted to the bottom surface of a horizontally extending shelf 12, the vertically extending handle of lid 25 is urged by gravity against the closed end 20 of the slot.

An upwardly extending hook shaped wall 30 is integrally connected to bottom wall 15 and extends outwardly of the four-sided main body 13 at an end of the main body opposite the open end 21 of slot 19. The hook shaped wall 30 includes a flat wall or flat portion 31 co-planar with bottom wall 15 and integrally connects bottom wall 15 to the upwardly extending distal end 32 of hook shaped wall 30. Side walls 16 and 17 terminate and slant downward from top wall 14 to bottom wall 15 in a direction toward distal end 32 thereby defining a first pair of stop surfaces 33 and 34. Distal end 32 is symmetrical about the longitudinal axis 36 extending centrally through main body 13 and is curved being formed by radius 35 pivoting about a point located on axis 36. Distal end 32 has its greatest vertical height as it crosses axis 36 and slants downwardly on the opposite sides thereof to flat portion 31 providing a second pair of stop surfaces 37 and 38. Thus, the first pair of stop surfaces 33 and 34 diverge relative to the second pair of stop surfaces 37 and 38 in a direction from flat portion 31 to shelf 12. The upper tip 39 of distal end 32 is spaced apart from the bottom surface 11 of shelf 12 forming a gap 40 through which the horizontally extending portion 74 of handle 41 (FIG. 7) of lid 42 may be extended and then located atop the upwardly facing surface 43 of flat portion 31 resting between the first pair of stop surfaces 33 and 34 and the second pair of stop surfaces 37 and 38.

Mounting means 73 (FIG. 2) in the form of double-sided adhesive tape is secured to the upper surface of top wall 14 to secure the bracket to the bottom surface of shelf 12. Means 73 has been omitted from FIG. 3 in order to illustrate a pair of holes 68 and 69 extending through wall 14 to receive conventional fastening devices to provide alternate mounting means. A rib 70 is integrally formed on the bottom of flat portion 31 and extends outwardly to the distal end thereby providing rigidity for the hook shaped distal end.

Figure 4:
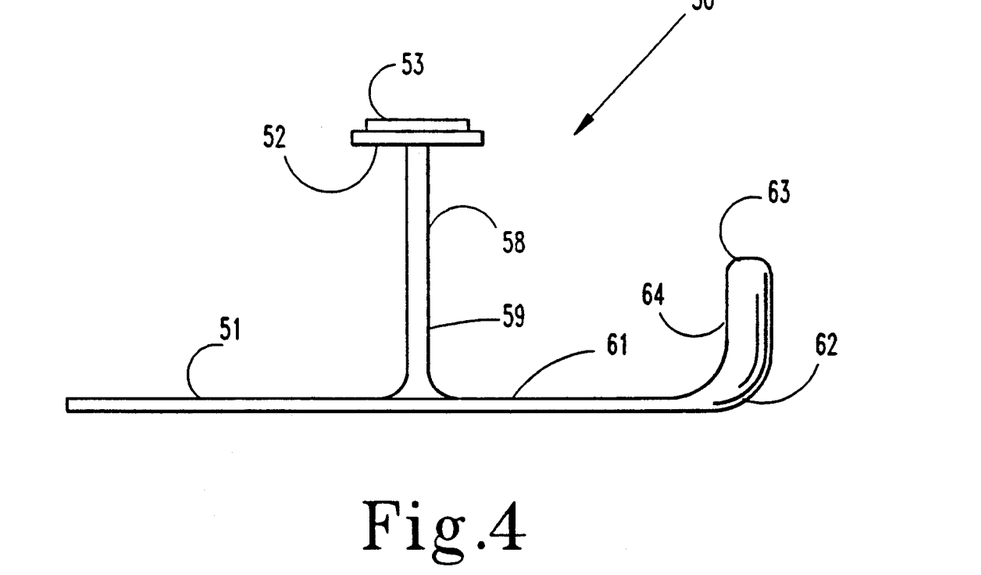
FIG. 4 is a side view of a fourth alternate embodiment of the POT LID HOLDER incorporating the present invention.
Figure 5:
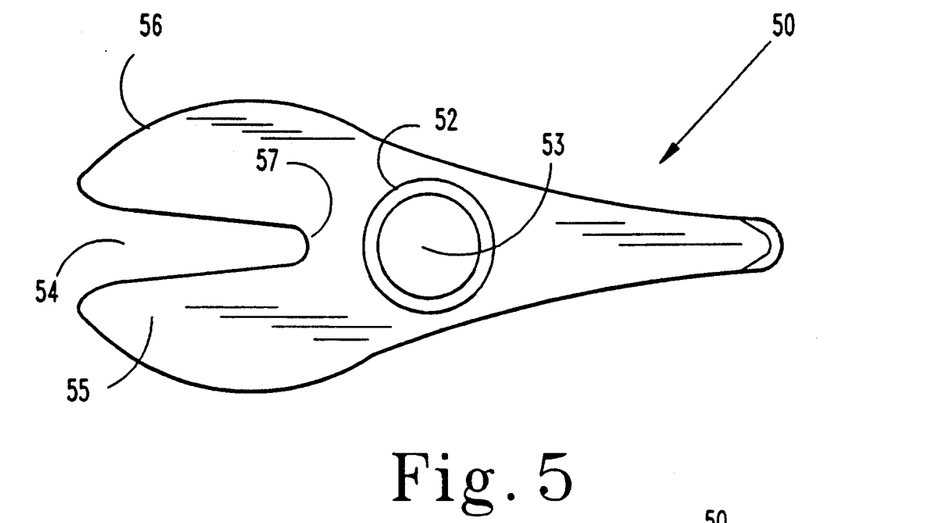
FIG. 5 is a top view of the POT LID HOLDER of FIG. 4.
Figure 6:
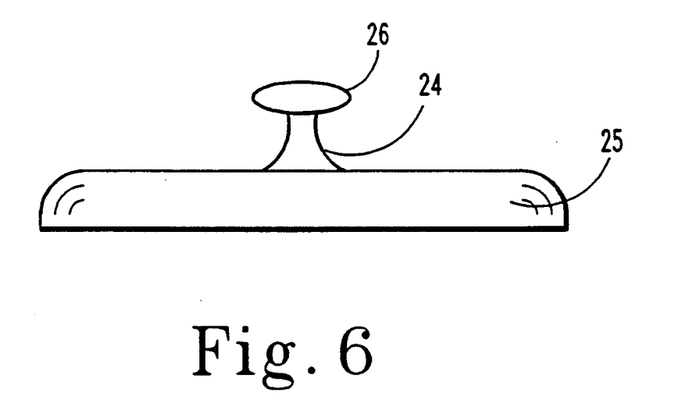
FIG. 6 is a side view of a typical pot lid having a knob-shaped handle.
Figure 7:
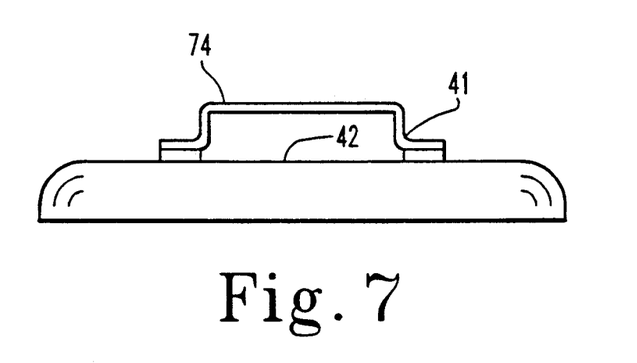
FIG. 7 is a side view of a typical pot lid having a handle a portion of which extends horizontally.

A fourth alternate embodiment of the pot lid holder is shown in FIGS. 4 and 5 and likewise is provided with a dual means for holding the lids of FIGS. 6 or 7. Lid holder 50 includes a sheet configured main body 51 integrally attached by an upwardly extending arm 58 to a flange 52 having the double-sided adhesive strip 53 provided thereon facilitating the mounting of flange 52 to the lower surface 11 of shelf 12. Located at one end of main body 51 are a pair of outwardly extending arms 55 and 56 forming slot 54 for receiving the vertically extending handle 24 of lid 25. The sheet main body 51 may be oriented at a slight angle relative to a vertical axis extending upwardly through arm 58 so as to position the closed end 57 of slot 54 at a slight elevation lower than the open end of the slot and thereby insuring that the handle of lid 25 rests against closed end 57.

A flat wall 61 is integrally connected to sheet configured main body 51 and extends aft of arm 58 having an upwardly facing surface to receive the horizontally extending portion 74 of handle 41 of lid 42. Distal end 62 extends upwardly having a top end 63 located beneath but spaced apart from the bottom surface 11 of shelf 12 allowing handle 41 to be moved between end 63 and the shelf and then placed atop wall 61. The mutually facing surfaces 59 and 64 of arm 58 and distal end 62 extend downward toward surface 61 providing a pair of stop surfaces to limit movement of the handle relative to the lid holder.

Figure 8:
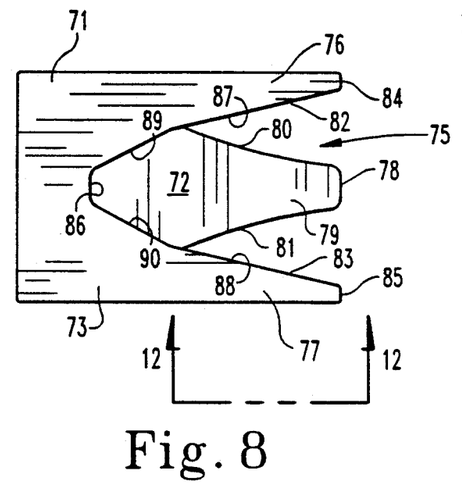
FIG. 8 is a top view of the preferred embodiment of the POT LID HOLDER incorporating my present invention.
Figure 9:
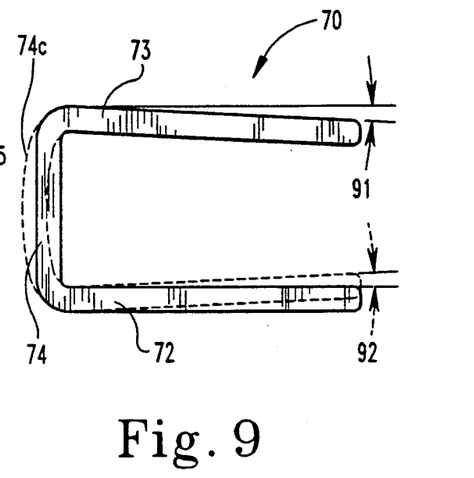
FIG. 9 is a side view of the holder of FIG. 8.

The preferred embodiment of the pot lid holder is shown in FIGS. 8 and 9. Holder 70 includes a generally C-shaped main body 71 including a pair of spaced apart walls 72 and 73 integrally joined to a third wall 74 extending therebetween. Wall 73 includes a slot 75 forming a pair of arms or tangs 76 and 77. The opposite wall 72 has its maximum width immediately adjacent wall 74 and extends in tapered fashion to end 78 thereby forming a third arm or tang 79 extending outwardly from wall 74. The third tang 79 is positioned equidistant between tangs 76 and 77. The opposite edges 80 and 81 of tang 79 may extend linearly or in a curved fashion from end 78 toward side wall 74. Likewise, the mutually opposed edges 82 and 83 of tangs 76 and 77 may extend along a straight line or in a general curved fashion from the outer ends 84 and 85 respectively of tangs 76 and 77, but in any event, edges 82 and 83 extend convergingly toward the closed end 86 of slot 75. In the version depicted in FIG. 8, each edge 82 and 83 includes a pair of slowly converging portions 87 and 88 followed by a pair of rapidly converging portions 89 and 90.

In the event handle 24 (FIG. 6) of the lid is to be inserted into slot 75, then wall 73 may be positioned lower in elevation than wall 72. On the other hand, in the event handle 41 (FIG. 7) is to be mounted to holder 70 then handle 71 is extended between walls 72 and 73 and over tang 79 with wall 72 located lower in elevation than wall 73.

Figure 13:
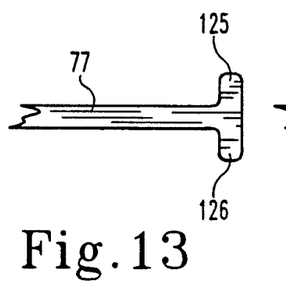
FIG. 13 is the same view as FIG. 12 only showing an alternate embodiment of the distal end of the tang.
Figure 14:
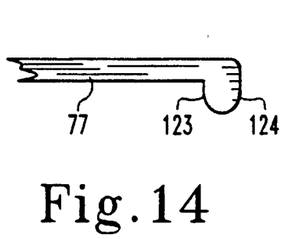
FIG. 14 is the same view as FIG. 12 showing yet a further version of the distal end of the tang.
Figure 15:
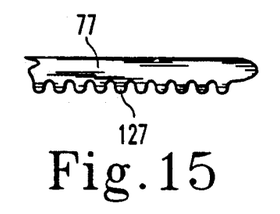
FIG. 15 is the same view as FIG. 12 only showing protuberances located on the upper tang surface.
Figure 20:
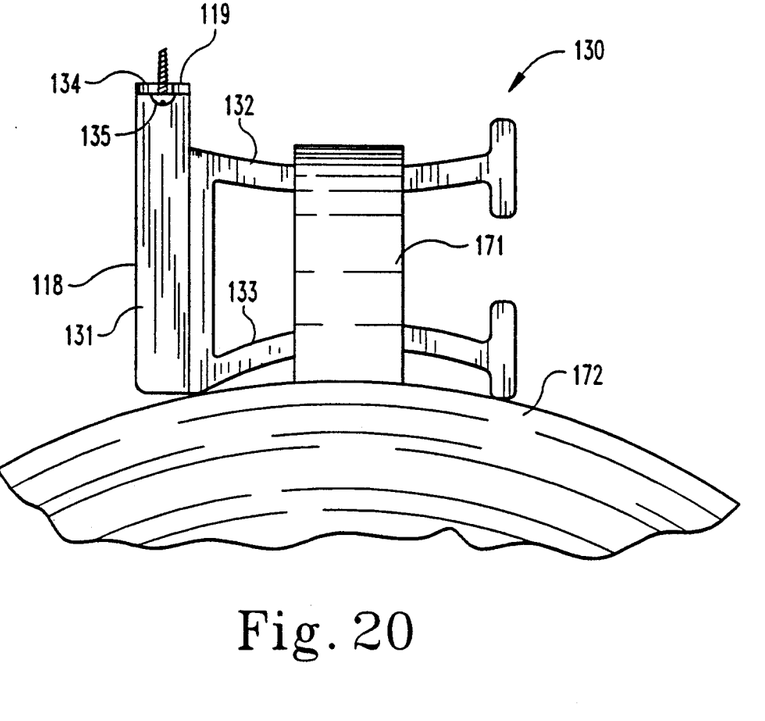
FIG. 20 is a side view of a further alternate embodiment of the holder in FIG. 9 shown having a pot lid held thereby.

A further variation of the present invention includes a pot lid holder 130 shown in FIG. 20. Holder 130 is similar to holder 70 (FIG. 9) with the exception that the tangs may be provided with the upwardly and downwardly extending portions 125 and 126 at the distal end thereof as shown in FIG. 13. Holder 130 includes an intermediate wall 131 extending between and integrally connected to top wall 132 and bottom wall 133. Walls 132 and 133 may be identical to wall 73 and 72 previously described. Further, a plurality of ears 134 are attached to wall 131 to allow fasteners 135 to be extended therethrough in the event the holder is to be mounted to a horizontal surface. In the embodiment shown in FIG. 20, walls 132 and 133 are slightly squeezed together to extend between the space existing between handle 171 and lid 172, thereby allowing the lid to be hung onto the holder. Handle 171 has opposite ends attached to lid 172 with the intermediate portion of the handle located equidistant between the handle ends being spaced apart from the lid and forming a gap into which walls 132 and 133 may be extended in the manner such as shown in FIG. 7 for lid 42. In lieu of mounting ear 134 by fastener 135, a fastener may be extended horizontally through wall 131 into an adjacent mounting surface. Likewise, adhesive may used to secure either surface 118 or 119 to a mounting surface.

Figure 17:
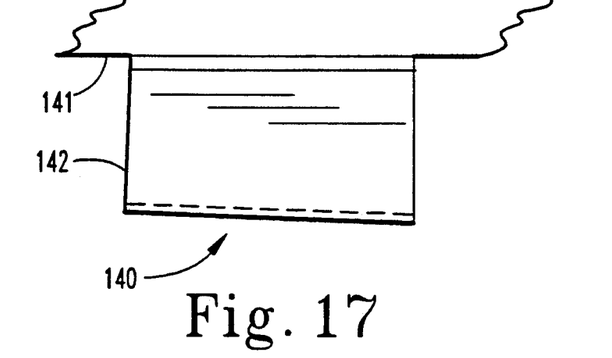
FIG. 17 is side view of an additional embodiment of the holder shown in FIG. 1.
Figure 18:
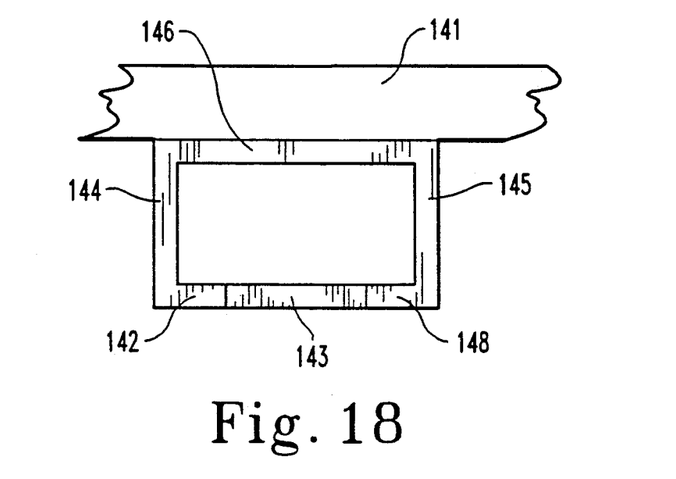
FIG. 18 is a front end view of the holder shown in FIG. 17.

FIGS. 17 and 18 disclose yet a further alternate embodiment of the pot lid holder incorporating the present invention. The holder depicted in FIGS. 17 and 18 is identical to the holder depicted in FIGS. 1-3, with the exception that the right end portion as shown in FIG. 1 has been removed and thus the holder of FIGS. 17 and 18 is not provided with the hook shaped end 32. Instead, holder 140 consists of a pair of side walls 144 and 145 integrally joined to a top wall 146 and bottom wall 148 with the walls being spaced apart to form a hollow interior to receive the handle 24 (FIG. 6) of lid 25. Wall 146 may be secured to a shelf or wall 141. Thus, end 142 of the holder includes an outwardly opening tapered slot 143 identical to slot 19 of FIG. 3. Further, wall 148 may slant upward positioning the open end of slot 143 closer to wall 146 than the closed end of the slot allowing the lid handle to rest atop wall 148 by the force of gravity.

Figure 19:
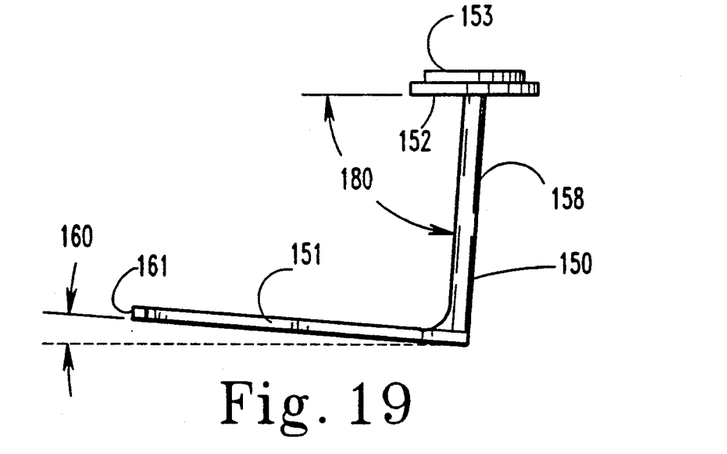
FIG. 19 is a side view of an alternate embodiment of the POT LID HOLDER depicted in FIG. 4.

An alternate embodiment of the holder depicted in FIGS. 4 and 5 is shown in FIG. 19. The holder shown in FIG. 19 is identical to the holder shown in FIGS. 4 and 5 with the exception that again the right portion or hooked shaped end as depicted in FIG. 4 has been removed from the holder and with the further exception that the upwardly extending arm 58 has been integrally attached to flange 52 at an acute angle, thereby positioning the slot shaped end of the holder to extend upwardly from the arm. Thus, holder 150 (FIG. 19) includes a sheet configured main body 151 arranged at angle 160 with respect to horizontal. Sheet 151 is integrally attached by the upwardly extending arm 158 to flange 152 at an acute angle 180 and has the double sided adhesive strip 153 provided thereon to mount the flange to the surface of a shelf or wall. End 161 of main body 151 includes an outwardly opening slot identical to slot 54 (FIG. 5). Thus, the knob 24 of lid 25 may be extended into the slot opening outwardly through end 161 with the knob then being held atop sheet 151 by the force of gravity. Alternatively, handle 171 (FIG. 20) may be extended atop sheet 151 with the lid 172 suspended beneath sheet 151. The present invention also includes joining arm 158 to flange 152 at a first angle so that sheet 151 extends through a plane arranged at angle 160 relative to the horizontal. That is, member 158 may be joined at a 90° angle relative to upper portion 152 whereas sheet 151 is joined at an acute angle relative to member 158.

The holder shown in FIGS. 8 and 9 can be mounted in any plane and further can be used to hold a pot lid having a knob or handle such as FIGS. 6 or 7. For example, by mounting wall 74 to a vertical surface while locating wall 73 beneath wall 72, a pot lid having a handle with a vertically extending axis such as depicted in FIG. 6 may be secured to the holder by locating handle 24 within slot 75 while positioning the headed top end 26 (FIG. 6) between the bottom wall 73 and the top wall 72. It will be noted from FIG. 9, that wall 72 is joined generally at a perpendicular angle to wall 74, whereas wall 73 extends toward wall 72 at angle 91. Thus, handle 171 of lid 172 or handle 41 of lid 42 may be rested atop bottom wall 73 by the force of gravity with the distal end of bottom wall 73 being located at a higher elevation as compared to the proximal end of the bottom wall which is attached to side wall 74, thereby preventing accidental disengagement of the lid handle from the bracket. Likewise, handle 24 may be extended into slot 75 resting atop wall 73 by the force of gravity. Since top wall 72 is joined perpendicularly to side wall 74, the bracket is particularly versatile in that top wall 72 may be secured to a horizontally extending shelf by adhesive means, fastening devices or other suitable means, thereby ensuring that the bottom wall 73 is still inclined with respect to the horizontal, thereby maintaining the handle within the bracket. Tang 78 is tapered having its minimum width at its distal end so that the outer handle ends joined to lid 172 may extend downwardly without direct interference between the handle and wall 72.

Many variations are contemplated and included in the holder disclosed in FIGS. 8 and 9. For example, wall 72 may also be oriented at an angle with respect to the horizontal, so that both walls 72 and 73 extend convergingly from side wall 74. In other words, wall 73 can extend toward wall 72 at angle 91, whereas wall 72 can also extend inwardly towards wall 73 at an angle shown by the dashed line 92. In such a case, the headed top end 26 of lid 25 may be located between walls 72 and 73 in an interfering manner securing the lid to wall 73. That is, the gap between walls 72 and 73 may be slightly less than the height of the lid knob, thereby providing an interfering fit.

Figure 10:
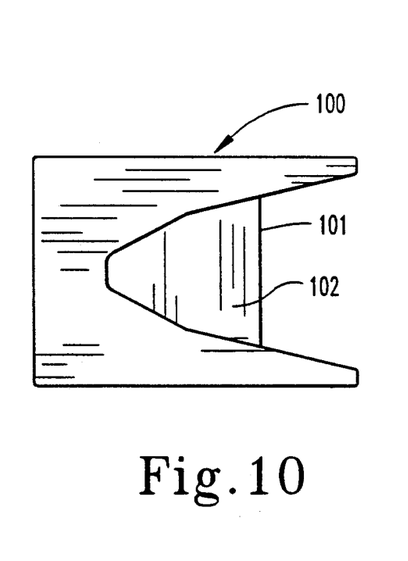
FIG. 10 is a top view of a first alternate embodiment of the POT LID HOLDER.
Figure 11:
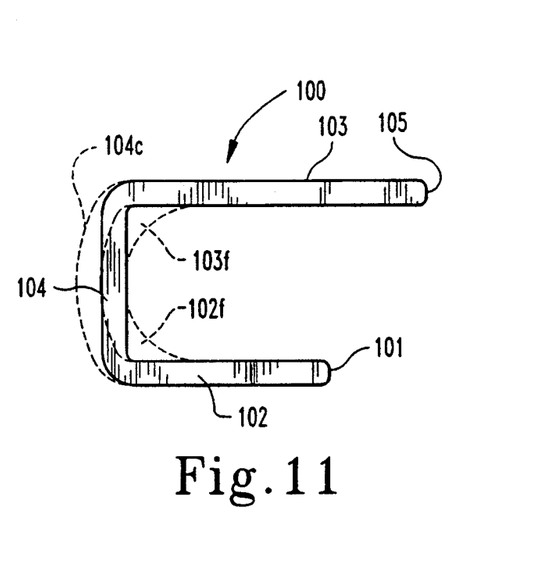
FIG. 11 is a side view of the holder of FIG. 10.

A variation of the preferred embodiment of FIGS. 8 and 9 is shown in FIGS. 10 and 11. Pot lid holder 100 is identical to pot lid holder 70 except wall 102 is not tapered like wall 72 and instead has an outer end 101 which is located closer to intermediate wall 104 than the outer end 105 of the second wall 103. Walls 103 and 104 are identical to walls 73 and 74 with wall 103 having a closed end slot which opens outwardly forming a pair of tangs identical to tangs 76 and 77. Wall 102 and 103 are shown as integrally joined perpendicularly to intermediate wall 104 in FIG. 11; however, it is to be understood that either or both of walls 102 and 103 may extend inwardly in a manner similar to walls 72 and 73 forming similar angles 91 and 92 with respect to a plane perpendicularly arranged relative to the intermediate wall 104. Further, wall 103 may extend toward wall 102 positioning the open end of the slot closer to wall 102 than the closed end of the slot.

Intermediate walls 74 and 104 are both shown as being entirely contained within separate planes. Such configuration is not critical since either or both intermediate wall 74 and 104 may each extend along a curved line such as shown by dashed lines 74c and 104c. Such curved walls will not subtract from the effectiveness of the holders but may be used for aesthetic purposes. To further enhance the strength or aesthetics of the pot lid holder, side walls or flanges 102f and 103f (FIG. 11) may be provided on the outer or inner edges respectively of walls 102 and 104 and walls 103 and 104. In other words, flanges 102f and 103f are perpendicularly arranged to walls 102-104 and are integrally formed on the inner or outer edges of walls 102-104 providing a slightly different looking holder but having all of the same attributes and features of the holder previously described. Similarly, flanges identical to flanges 102f and 103f may be provided on the inner or outer edges of walls 72-74 of holder 70.

Figure 12:
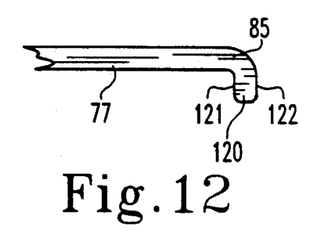
FIG. 12 is a fragmentary front view of tang 77 taken along a line and viewed in the direction of the arrows 12—12 of FIG. 8.
Figure 16:
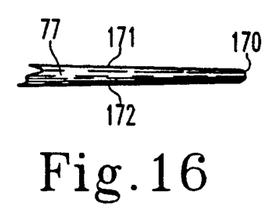
FIG. 16 is the same view as FIG. 12 only showing a tapered tang.

The holders disclosed herein may be varied in configuration to achieve the objective of holding the pot lid handle in a variety of different orientations. For example, to enhance the holding action of the tangs relative to the lids or utensils, the distal ends of the tangs may be shaped to prevent accidental disengagement. A portion of one such tang 77 is shown in FIGS. 12-15. The distal end 85 of tang 77 is provided with an inwardly extending tip 120 which extends toward the opposite wall 72. Tip 120 may take a variety of shapes. In FIG. 12, tip 120 includes a pair of generally flat services 121 and 122 which extend inwardly from tang 77. Whereas, in FIG. 14, the outer tip includes a pair of curved surfaces 123 and 124 providing a rounded shape. The tip in FIG. 13 includes not only an inwardly extending portion 125 but also an outwardly extending portion 126. To further enhance the gripping action between the tangs and the handle of the pot lid, a plurality of friction areas or protuberances 127 may be formed on any of the surfaces of tang 77 in direct contact with the handle lid. Protuberances 127 also enhance the aesthetics of the holder. It is understood, the remaining tangs shown in FIGS. 8-11 may be provided with the same features as shown for tang 77 in FIGS. 12-15. A further variation of a configuration of the tangs is depicted in FIG. 16. Tang 77 as well as the other tangs of the pot lid holder may be provided with a tapering thickness so that the thickness of the tang measured from the top surface 171 to the bottom surface 172 of the tang has a minimum thickness at the distal end 170 with a thickness then increasing towards the intermediate wall 74 or 104. Thus, the knob lid, handle lid or utensil may be extended between walls 72 and 73 or 102 and 103 thereby becoming wedged between the walls due the increasing thickness of the tangs.

Many advantages of the present invention will be apparent from the prior description. For example, the pot lid holder solves a major problem in most households. By using the holder, one will be able to greatly organize the kitchen and the storing of pot lids and maximize the use of air space within a cabinet or on a wall. The holder solves the problem of finding quickly the right lid for the right pot without the noisy, backbreaking daily job searching through a pile of lids. The glass or metal lids will be separated thus increasing the life of the lid and the surface finish. Normally wasted shelf space will be eliminated. The holder is small, compact, durable and easy to manufacture in economical fashion. Because of the low profile of the bracket, it does not interfere with other items on the shelf and still provides easy access whereas prior brackets typically occupy a great amount of space. The holder disclosed herein can be produced from numerous materials with a variety of colors or surface finishes. The holder can be produced for over the edge mounting. Likewise, the holder may be utilized to mount items other than pot lids.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. All of the mounting brackets disclosed herein provide versatility in that the bracket or pot lid holder may be mounted in any plane including the vertical or horizontal plane and can be mounted at any angle relative to these planes. That is, the pot lid holder may be mounted not only beneath a horizontal shelf but on a vertical wall, and inclined wall or any wall or mounting surface at any angle. The user may therefore determine how the pot holder is to be oriented or mounted to achieve its maximum effectiveness. The pot lid holders disclosed herein may be mounted by fasteners or adhesives, applied to the adjacent surface of the holder and mounting wall or shelf.

What is claimed is:

1. A bracket for hanging to a wall a lid with a handle comprising:

a main body mountable to said wall and including an upper portion, said main body further including a lower portion spaced apart by a gap from said upper portion with said lower portion having a first end portion and a second end portion, said lower portion including hanging means located at an end of said lower portion with said hanging means having an upwardly facing stop surface operable by gravity to removably hold and retain said handle in said gap to secure said lid to said wall; and, mounting means operable to secure said main body to said wall; and wherein:

said lower portion extends upwardly from said first end portion to said second end portion with said handle resting against said stop surface when mounted by said hanging means, said hanging means includes a slot at said second end portion in said lower portion to vertically receive a handle of a lid and wherein said main body is a four sided channel with an upper wall extending in an upper plane, a lower wall and a pair of side walls joining said upper wall to said lower wall and defining a hollow interior, said lower wall including an outwardly opening slot to receive and hold a handle and position said handle within said hollow interior.

2. A bracket for hanging to a wall a lid with a handle comprising:
a main body mountable to said wall and including an upper portion, said main body further including a lower portion spaced apart by a gap from said upper portion, said main body further includes an intermediate wall extending between and integrally connected to said upper portion and said lower portion, said upper portion and said lower portion bendable in a direction together to allow projection of said lower portion and said upper portion between the lid and attached handle.

3. A bracket for hanging to a wall a lid with a handle comprising:
a main body mountable to said wall and including an upper portion, said main body further including a lower portion spaced apart by a gap from said upper portion with said lower portion having a first end portion and a second end portion, said lower portion including hanging means located at an end of said lower portion with said hanging means having an upwardly facing stop surface operable by gravity to removably hold and retain said handle in said gap to secure said lid to said wall; and,
mounting means operable to secure said main body to said wall; and wherein:
said lower portion includes an outwardly opening slot forming said hanging means dividing said lower portion into a pair of tangs, said main body further includes an intermediate wall extending between and integrally connected to said upper portion and said lower portion.

4. The bracket of claim 3 and further comprising:
ears formed on said tangs to limit movement of said handle relative to said handle, said tangs include distal ends with said ears formed thereon.

5. The bracket of claim 3 and further comprising:
a plurality of projections formed on said bottom portion and facing upwardly providing a stop surface for said handle to rest and be held thereon.

6. The bracket of claim 3 wherein:
said upper portion and said lower portion each have proximal ends joined to said intermediate wall and distal ends located outwardly thereof, said upper portion and said lower portion extend convergingly from said proximal ends to said distal ends.

7. A bracket for hanging to a wall a lid with a handle comprising:
a main body mountable to said wall and including an upper portion, said main body further including a lower portion spaced apart by a gap from said upper portion with said lower portion having a first end portion and a second end portion, said lower portion including hanging means located at an end of said lower portion with said hanging means having an upwardly facing stop surface operable by gravity to removably hold and retain said handle in said gap to secure said lid to said wall; and,
mounting means operable to secure said main body to said wall; and wherein:
said main body further includes an intermediate wall extending between and integrally connected to said upper portion and said lower portion, said lower portion includes a distal end with said lower portion decreasing in width from said intermediate wall to said distal end to allow projection of said lower portion between the lid and attached handle.

8. The bracket of claim 7 wherein:
said upper portion includes an outwardly opening slot dividing said upper portion into a pair of tangs, said main body reversibly mountable to locate said lower portion above said upper portion to enable a vertically extending handle of a lid to extend into said slot securing same to said main body.

9. The bracket of claim 7 wherein:
said upper portion has a distal end; and
said upper portion and said lower portion extend convergingly in a direction from said intermediate wall to said distal end of said upper portion and said lower portion.

10. A bracket for hanging to a wall a lid with a handle comprising:
a main body including an upper portion mountable to said wall, said main body further including a lower portion spaced apart by a gap from said upper portion with said lower portion having a first end portion and a second end portion, said lower portion including hanging means located at an end of said lower portion with said hanging means having an upwardly facing stop surface to removably hold and retain said handle in said gap to secure said lid to said wall with said handle resting against said stop surface when mounted by said hanging means; and wherein:
said main body includes a downwardly extending rod joined to said upper portion at an acute angle with a bottom end portion joined to said lower portion positioning said lower portion to extend in a plane arranged at a further acute angle relative to horizontal, said lower portion having an outwardly opening slot to receive and hold said handle thereto 11. A bracket for hanging to a wall a lid with a handle comprising:
a main body including an upper portion mountable to said wall, said main body further including a lower portion spaced apart by a gap from said upper portion with said lower portion having a first end portion and a second end portion, said lower portion including hanging means located at an end of said lower portion with said hanging means having an upwardly facing stop surface to removably hold and retain said handle in said gap to secure said lid to said wall with said handle resting against said stop surface when mounted by said hanging means; and
wherein said main body includes a downwardly extending member joined to said upper portion at a first angle with a bottom end portion joined to said lower portion at a second angle positioning said lower portion to extend in a plane arranged at an acute angle relative to horizontal, said lower portion having an outwardly opening slot to receive and hold said handle thereto.

* * * * *